(12) United States Patent
Hamann et al.

(10) Patent No.: US 7,738,207 B2
(45) Date of Patent: *Jun. 15, 2010

(54) OPTICAL STORAGE SYSTEM USING AN ANTENNA FOR RECORDING INFORMATION DATA TO A PHASE-CHANGE TYPE MEDIUM

(75) Inventors: Hendrik F. Hamann, Mohegan Lake, NY (US); Yves C. Martin, Ossining, NY (US); Hemantha K. Wickramasinghe, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/772,570

(22) Filed: Jul. 2, 2007

(65) Prior Publication Data

US 2008/0007858 A1   Jan. 10, 2008

Related U.S. Application Data

(63) Continuation of application No. 10/284,259, filed on Oct. 31, 2002, now Pat. No. 7,280,297.

(51) Int. Cl.
   *G11B 5/02* (2006.01)
(52) U.S. Cl. .................... 360/59; 369/13.33
(58) Field of Classification Search ........... 369/13.13, 369/13.33; 360/59
   See application file for complete search history.

(56) References Cited

U.S. PATENT DOCUMENTS

| 4,818,666 | A | * | 4/1989 | Gravesteijn et al. ........... 430/19 |
|---|---|---|---|---|
| 4,839,883 | A | * | 6/1989 | Nagata et al. ................ 369/286 |
| 4,918,683 | A | * | 4/1990 | Kodera et al. ............ 369/275.2 |
| 5,179,547 | A | * | 1/1993 | Komaki et al. ........... 369/275.4 |
| 5,521,901 | A | * | 5/1996 | Okada et al. ............. 369/275.2 |
| 5,602,820 | A |   | 2/1997 | Wickramasinghe et al. |
| 5,878,022 | A | * | 3/1999 | Okada et al. ............. 369/275.4 |
| 6,233,206 | B1 |  | 5/2001 | Hamann et al. |
| 6,433,310 | B1 |  | 8/2002 | Wickramasinghe et al. |
| 6,532,125 | B1 |  | 3/2003 | Hamann et al. |
| 6,597,639 | B1 |  | 7/2003 | Hamann et al. |
| 6,702,186 | B1 |  | 3/2004 | Hamann et al. |
| 6,771,445 | B1 |  | 8/2004 | Hamann et al. |
| 6,982,844 | B2 |  | 1/2006 | Rettner et al. |
| 7,106,664 | B2 | * | 9/2006 | Hasegawa et al. ........ 369/13.33 |
| 2003/0112542 | A1 | | 6/2003 | Rettner et al. |
| 2003/0118936 | A1 | | 6/2003 | Okubo |

OTHER PUBLICATIONS

Martin, et al., "Resolution Test for Apertureless Near-Field Optical Microscopy", Journal of Applied Physics, vol. 91, No. 5, pp. 3363-3368, Mar. 1, 2002.
Martin, et al., "Strength of the Electric Field in Apertureless Near-Field Optical Microscopy", Journal of Applied Physics, vol. 89, No. 8, pp. 1-5, Apr. 15, 2001.

* cited by examiner

*Primary Examiner*—Tan X Dinh
(74) *Attorney, Agent, or Firm*—McGinn IP Law Group PLLC; Stephen C. Kaufman, Esq.

(57) ABSTRACT

An assembly and method for recording and/or reading high-density data includes a phase change media, an antenna placed adjacent the phase change media, and a source of electromagnetic radiation.

26 Claims, 5 Drawing Sheets

OPTICAL STORAGE SYSTEM USING AN ANTENNA FOR RECORDING INFORMATION DATA TO A PHASE-CHANGE TYPE MEDIUM

RELATED APPLICATIONS

The present Application is a Continuation Application of U.S. patent application Ser. No. 10/284,259, filed on Oct. 31, 2002 now U.S. Pat. No. 7,280,297.

BACKGROUND OF THE INVENTION

1. Field of the Invention

The present invention relates to a novel method and assembly for recording data at a very high density on phase-change media and phase-change media structures for this novel method.

2. Description of the Related Art

Conventional methods for reading and writing on a media include optical methods such as CD-ROM and magneto-optical (MO) storage devices. By focusing a laser beam to about one micrometer onto the storage media, one can read and sometimes record/erase information.

The density of an optical memory device is mainly diffraction limited. Specifically, with a focusing lens having a high numerical aperture, the corresponding radius of the focused beam spot cannot be smaller than half the illumination wavelength. Current commercial devices are already close to this resolution limit.

Magneto-optical recording methods use a focused laser beam as well to create a hot spot on a magnetic medium. The magnetic media, in turn, typically comprises a thin film magnetic media, which, at ambient temperature, has a high magnetic coercivity and is non-responsive to an externally applied magnetic field.

A conventional method for reading high density bits and apparatus therefor includes decoding high density data encoded in a digital recording media as a series of tags comprising an information bit pattern including a tracking bit pattern.

Several approaches have been demonstrated to improve on the resolution. First, more efficient lasers emitting shortened wavelengths may be used. Typically, a reduction of wavelength by a factor of two can be expected to provide a four fold increase in data storage density. However, the lasers required for such high storage densities are very expensive and further advances by reduction in the wavelength are not in the foreseeable future.

An approach for overcoming the diffraction limit uses evanescent waves, which can be confined due to their non-propagating properties to dimensions significant less than the wavelength of the laser. However, these methods often have poor signal-to-noise ratio, reliability and speed.

SUMMARY OF THE INVENTION

In view of the aforementioned and other problems, drawbacks, and disadvantages of the conventional methods and structures, an object of the present invention is to provide an assembly, a method and a media structure in which superior recording on a phase change media is realized.

An object of this invention is to provide a method and assembly for recording/reading, on phase change media, bits with a size substantially smaller than a conventional focused laser spot.

Another object is to provide a media structure which is a phase-change media, which provides superior storage densities.

Co-pending, co-authored U.S patent application Ser. No. 09/540,726 filed on Mar. 31, 2000, entitled ASSEMBLY AND METHOD SUITABLE FOR THERMO-MAGNETIC WRITING/READING OF DATA, incorporated herein in its entirety, discloses an assembly for writing/erasing on a thermo-magnetic recording media as a series of tags including a magnetic information bit pattern. The assembly includes: 1) an antenna placed near a thermo-magnetic media; 2) a source of electromagnetic radiation at least a portion of which can be coupled to the antenna; and 3) means for coordinating a mutual positioning of the source of electromagnetic radiation and the antenna so that the antenna can generate a highly localized electromagnetic field in the vicinity of the media for inducing localized heating of the media.

In contrast to the apparatus disclosed in the above-mentioned co-pending patent application, in the present invention, the media is not necessarily magnetic, but rather a phase change media. The present invention provides a better solution through the use a phase change media instead of a magnetic media.

In an exemplary embodiment of the invention, the phase change media has a thermal conductivity which is typically 10× smaller than a magnetic layer which greatly improves the recording density.

In a first aspect of the present invention, an assembly for recording (writing/erasing) high-density data, includes a phase change media having a thermal conductivity which is lower than or equal to the substrate; an antenna placed near the phase change media; and a source of electromagnetic radiation.

In a second aspect of the present invention, a method of recording (writing/erasing) high-density data, includes providing an electromagnetic wave; providing a phase change media having a thermal conductivity which is lower than or equal to the substrate; and positioning an antenna near the phase change media for coupling the electromagnetic wave with the phase change media.

In a third aspect of the present invention, an assembly for writing/erasing/reading high-density data on a recording media as a series of tags. The assembly includes a phase change media, an antenna positionable near the media, a source of electromagnetic radiation for producing an incident wave at least a portion of which may be coupled to the antenna, and a positioning device that coordinates mutual positioning of the source of electromagnetic radiation and the antenna so that the antenna can generate a highly localized electromagnetic field in the media.

In an exemplary embodiment of the invention, the antenna is capable of recording (writing/erasing) by generating a strong highly localized electromagnetic field in the media for inducing local heating of the media and which is capable of reading by probing the phase with a highly localized electromagnetic field.

In another exemplary embodiment of the present invention, the antenna generates a highly localized field in the media for reading the information pattern at low power of the source of eletromagnetic radiation and/or b) recording information patterns by inducing local heating at high power of the source of electromagnetic radiation.

Another advantage of this novel method is that it is compatible with a method for reading high density bits as disclosed in U.S. Pat. No. 5,602,820.

BRIEF DESCRIPTION OF THE DRAWINGS

The foregoing and other purposes, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
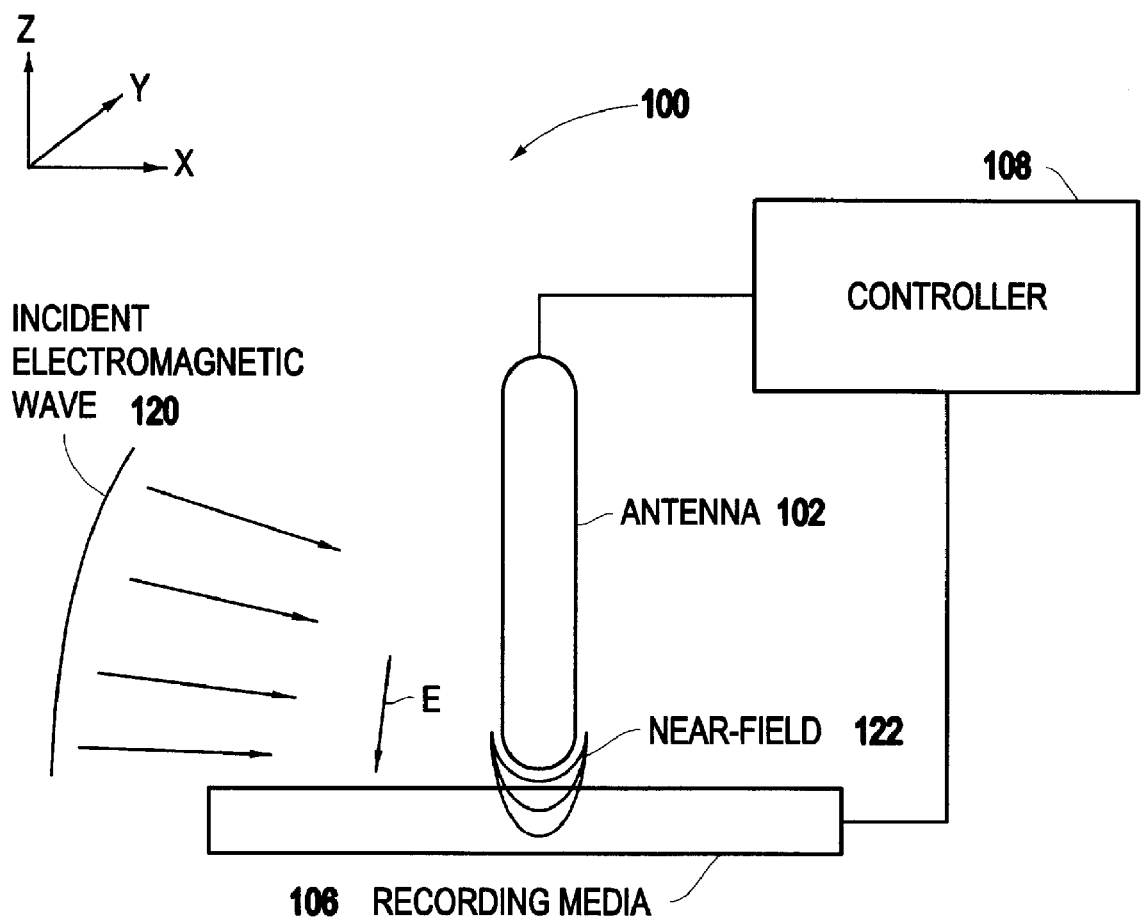
FIG. 1 shows an exemplary embodiment of an apparatus 100 which is capable of performing a method in accordance with the present invention.

Referring now to the drawings, there are shown exemplary embodiments of the assembly, the methods and the structures according to the present invention.

In overview, the present invention can circumvent the diffraction limit by near-field methods. Preferably, an antenna including a nanometric scattering solid (or scatterer) may be excited with an electromagnetic field such as a laser beam, to thereby generate an enhanced and highly localized electromagnetic field in the near vicinity of a recording media. By optimizing shape, size, and material type of the antenna and the phase-change recording media, as well as choosing the best geometry, polarization, and wavelength for the exciting electromagnetic field, one can generate an electromagnetic near-field source with a substantially larger magnitude than the original exciting field. This near-field is also highly localized to the immediate area near the antenna. The strongly enhanced and highly localized electromagnetic near-field can either heat the phase-change recording media, in order to write information patterns, or, at lower power settings, it can be used for reading by probing the local optical properties of the recording media.

From a physics point of view, this enhancement is due to the oscillating charges within the antenna. At some point during the oscillation, charges accumulate at the end of the antenna and produce an enhanced near-field. In a slightly different way of looking at this, the incident field lines should match the boundary conditions of the antenna and phase change recording media. At a sharp point all the field lines are concentrated and give rise to an enhanced near-field at the end of the antenna, which acts as a lightening rod for the incident wave. This effect is enhanced when the gap between antenna and recording media is kept small, which is generally the case for the gap between a recording/reading head and the phase change media in phase-change recording.

In addition to this geometric enhancement, electromagnetic resonance in the antenna/phase change media system can further enhance near-fields. Antenna-like resonance, obtained by optimizing the geometry of the materials (especially the length of the antenna), or surface plasmon resonance (charge density waves), excited by operating at certain frequency ranges for selected types of material (for example, silver, gold and aluminum) with given shape and size, can further induce enhancement.

Theoretical calculations have shown that this enhanced near-field extends substantially into the media, even if it is conducting. Heat is therefore generated throughout the phase change media, in a direct manner. Because of the small dimensions involved, time constraints for heating and cooling are extremely fast (nanosecond) and operating frequencies may reach into the Ghz regime Furthermore, by appropriately choosing the antenna and the phase-change media material, one can maximize heat deposition in the film and minimize heating the antenna (and therefore the recording head).

FIG. 1 shows an exemplary embodiment of an apparatus 100 which may be adapted to perform a method in accordance with the present invention. The apparatus 100 includes an antenna 102 (e.g., a nanometric antenna), an electromagnetic source 104, a phase change recording media 106, and a position controller 108. The antenna 102 is adapted to amplify the incident electromagnetic field 120, preferably in a near-field zone 122. The geometry and material type for this antenna 112 may be modified to ensure maximum field enhancement as disclosed in co-pending, co-authored U.S. patent application Ser. No. 09/540,726 filed on Mar. 31, 2000.

The antenna 102 is excited by an incident electromagnetic field 120, such as can be provided by a laser beam having proper direction, focus, polarization and wavelength as is described in co-pending, co-authored U.S. patent application Ser. No. 09/540,726 filed on Mar. 31, 2000. The associated illumination optics (not shown) can use conventional bulk optical components (e.g. lenses, mirrors) or integrated components (e.g. optical fibers, optical micro-strips). The choice of the wavelength may require matching to the length of the antenna. In a typical application, the source or laser may be modulated in order to write the information on the phase-change recording media.

The controller 108 is adapted to mutually position the antenna 102 to the phase change media 106. One exemplary embodiment of the apparatus 100, incorporates the antenna 102 with a sensor (not shown) directly in the head of a conventional recording system as we know it from magnetic recording.

In one exemplary embodiment, an electronic system and/or air bearing mechanism can control the position and height of the head over the phase change recording media. The small gap between the head and the phase change recording media contributes advantageously to the need of positioning the antenna at a close distance from the phase change recording media (typically 20 nm or less).

An exemplary embodiment of this invention is based on aperture-less near-field enhancement, used for the purpose of locally heating a phase change media. Detailed finite element calculations (e.g., Y. Martin et al. J. Appl. Phys. 89, 5774 (2001)) as well as experimental data (Y. Martin et al. J. Appl. Phys. 91, 3363 (2002)) have demonstrated that highly localized and strong near-fields in the vicinity of correctly designed and properly driven antennas can be generated. However, the "stray" heating from the drive laser remains a major problem in conventional systems.

Figure 2:
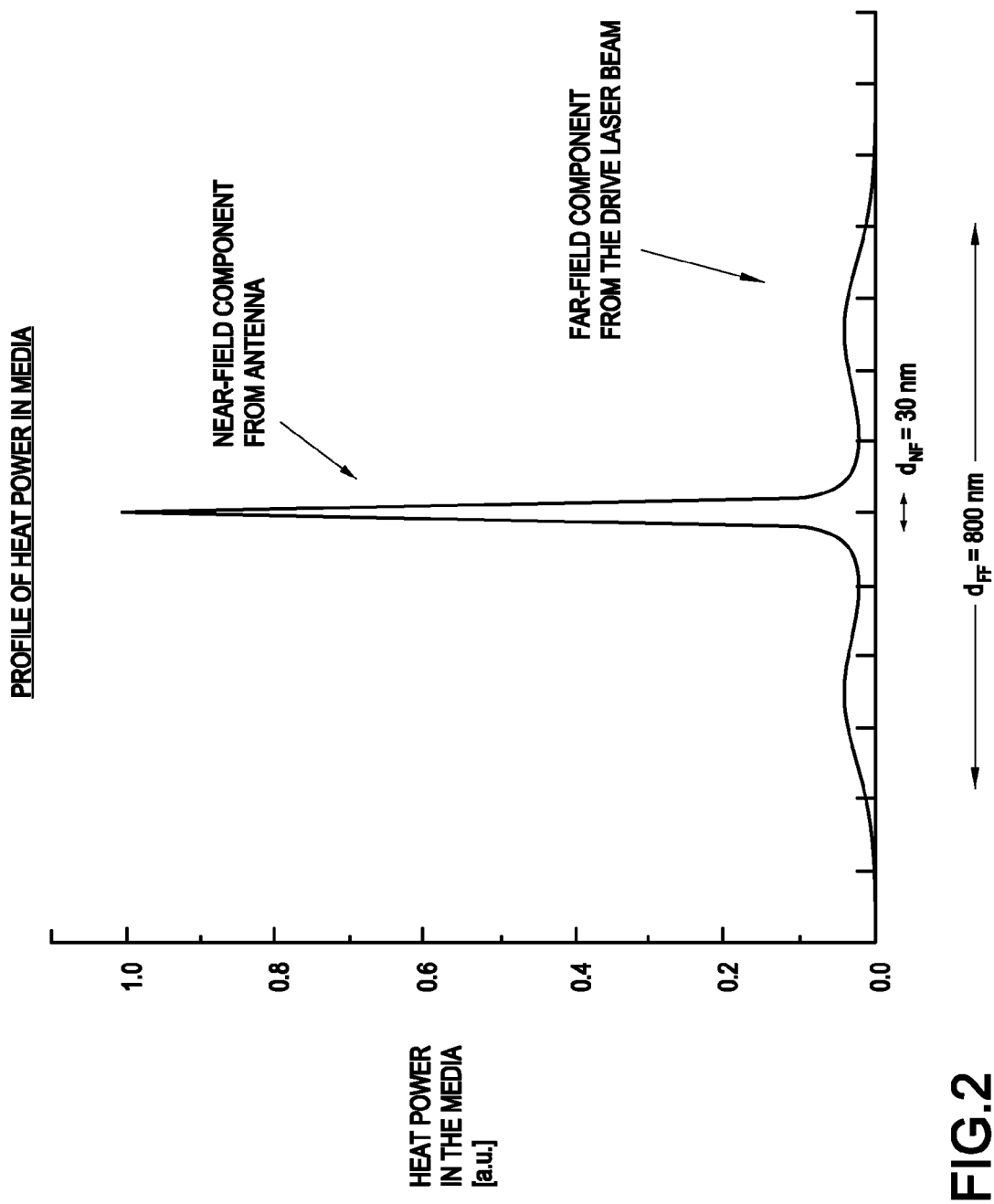
FIG. 2 shows a cross-section of power dissipation in a Co/Pt magnetic film.

In order to illustrate this problem, the inventors calculated the dissipated power in a Co/Pt magnetic film, which interacts with the near-field of the antenna 102 (see FIG. 1). In this example, the incident drive beam is radial in order to provide polarization along the elongated probe axis and has a diameter of 0.8 micrometer. The graph of FIG. 2 shows a cross-section of the dissipated power, which reveals two distinct parts. The sharp peak in the middle (~30 nm) represents the enhanced near-field of the antenna, while the long tails at both sides arise from the drive beam. Thus, the "stray" heating from the drive laser remains a major problem in conventional systems.

Figure 3B:
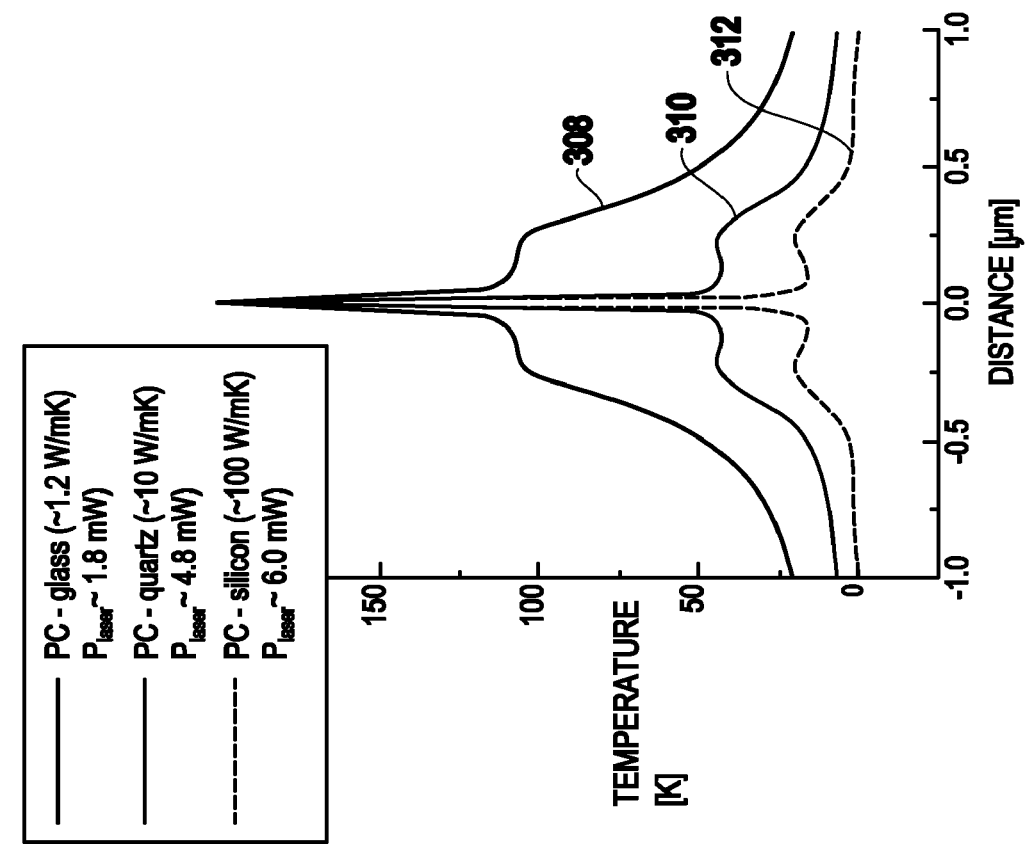
FIGS. 3A and 3B show the effects provided by the incident drive beam from FIG. 2 on a conventional thermo-magnetic media and a phase change media in accordance with an exemplary embodiment of the present invention.
Figure 3A:
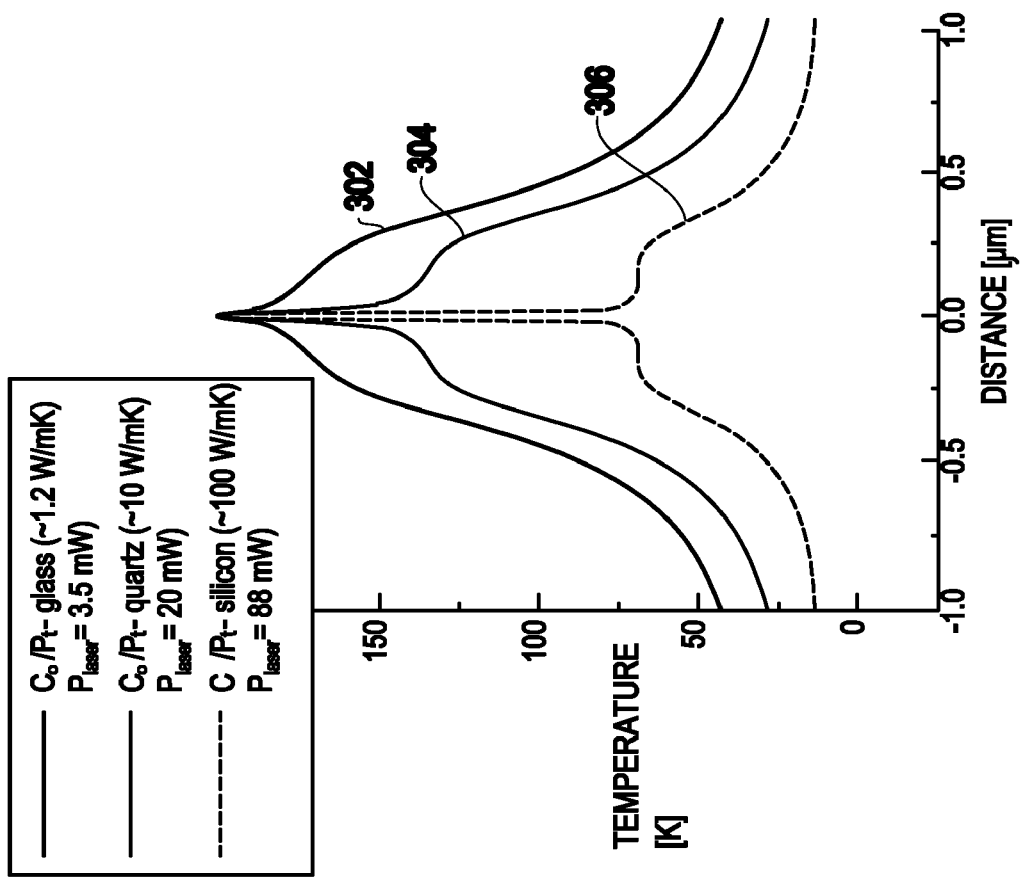

FIGS. 3A and 3B show the effects provided by the incident drive beam from FIG. 2 on a conventional thermo-magnetic media and a phase change media in accordance with the present invention, respectively. FIG. 3A shows the steady state temperature distribution for a typical perpendicular magnetic recording media (10 W/mK, 10 nm thick) on a glass substrate (1.2 W/mK). This temperature distribution illustrates that the heating of the localized near-field can be severely smeared out by the heating due to the drive beam. This smearing results in a very poor contrast ratio between the near-field region and the surrounding region of the media.

Additionally, the inventors calculations have demonstrated that an incident laser power of 3.5 mW may be required to raise the peak temperature in the Co/Pt sample by 200 K.

FIG. 3A shows a simple physical picture for the degraded contrast ratio between near-field and the surrounding media regions. The temperature profiles in FIGS. 3A and 3B result from the heating with two heat spot sources: a small source with diameter $d_{NF}$~30 nm (see FIG. 2), caused by the near-field intensity ($I_{NF}$) under the antenna, and a large source with diameter $d_{FF}$~800 nm caused by the intensity ($I_{FF}$) from the far-field of the focused laser beam.

The ratio of the intensity of these two sources, obtained from electromagnetic finite-element calculation, is the ratio from the peak height to the side-lobe height in FIG. 2.

For simplification of the calculations for this example, the inventors also assumed that the near-field heat source mostly interacts with the thin film (which has a thermal conductivity $l_{film}$) while the far-field heat spot mostly heats the substrate (which has a thermal conductivity $l_{sustrate}$) With these simplifying assumptions, the temperature ratio in the near-field ($T_{NF}$) versus the far-field ($T_{FF}$) can be approximated by the formula:

$$T_{NF}/T_{FF}=(d_{NF}/d_{FF})(I_{NF}/I_{FF})(l_{substrate}/l_{film}) \quad (1)$$

Three ratios govern the magnitude of $T_{NF}/T_{FF}$. The first ratio, $d_{NF}$ $d_{FF}$, is determined by fixed geometry: $d_{NF}$ corresponds to the desired bit size, and $d_{FF}$ corresponds to the smallest optical focused spot that one can produce (about half the optical wavelength). The second ratio, $I_{NF}/I_{FF}$, is determined by the physics of near-field electromagnetism; under an optimum and practical configuration, the inventors found a value of about 20 for this ratio. The third ratio, $l_{substrate}/l_{film}$, is a ratio in thermal conductivity.

With appropriate choice of materials, the inventors have discovered that one can substantially modify the thermal conductivity ratio to maximize the peak temperature and $T_{NF}/T_{FF}$ in order to produce a highly localized heat spot on the phase change media in comparison with conventional magnetic media. The difference between a magnetic media and a phase change media is explained below.

Thermal profiles in conventional magnetic thin film media are shown in FIG. 3A, for three different substrates. The ratio $l_{substrate}/l_{film}$ increases from the glass substrate 302 ($l_{substrate}/l_{film}$~0.1), to the quartz substrate 304 20 ($l_{substrate}/l_{film}$~1), and to the silicon substrate 306 ($l_{substrate}/l_{film}$~10), and is accompanied by an increase in the temperature contrast, $T_{NF}/T_{FF}$. However, this increase comes at a price, namely the required incident laser power.

For a 200 K peak temperature, the required laser power increases from approximately 3.5 mW for glass 302, to 20 mW for quartz 304 and to 90 mW for silicon 306. Such a large power is impractical and is presently too expensive. A typical laser power in an optical drive is in the order of a few milliwatts. The requirement to obtain a high contrast ratio $T_{NF}/T_{FF}$ with a low laser power limits the applicability of the thermo-magnetic media disclosed in the above-mentioned U.S. patent application Ser. No. 09/540,726 filed on Mar. 31, 2000. The present invention provides a better solution through the use a phase change media instead of a magnetic media.

In the case of a phase-change media (e.g., formed of one or more of chalcogenides, GaSb, InSb, GaSeTe, AgInSbTe, $Sb_2Te_2Ge_5$, etc), the phase of the media may be changed by heating. As an example, a fast and strong heat pulse may convert the media from a crystalline phase to an amorphous phase. In this process, the phase change media is melted and then kinetically trapped in a thermodynamically less stable amorphous phase (~500° C.). The media can then be converted back to the crystalline phase by applying a slightly longer (~100 ns) but weaker heat pulse (~200° C.).

An advantage of phase-change media is its very low thermal conductivity. In one exemplary embodiment the thermal conductivity for a phase-change media may be approximately 0.6 W/mK in the crystalline phase (more than a factor 10 less than a very thin magnetic film) and approximately 0.2 W/mK in the amorphous phase. As a result, the contrast ratio between far-field and near-field heating can be increased without a high laser power cost.

Thus, as shown in FIG. 3B, the temperature profiles 308, 310 and 312 for a 10 nm thick phase-change media for three different substrates demonstrates a significantly improved contrast ratio as well as moderate power requirements.

Figure 4:
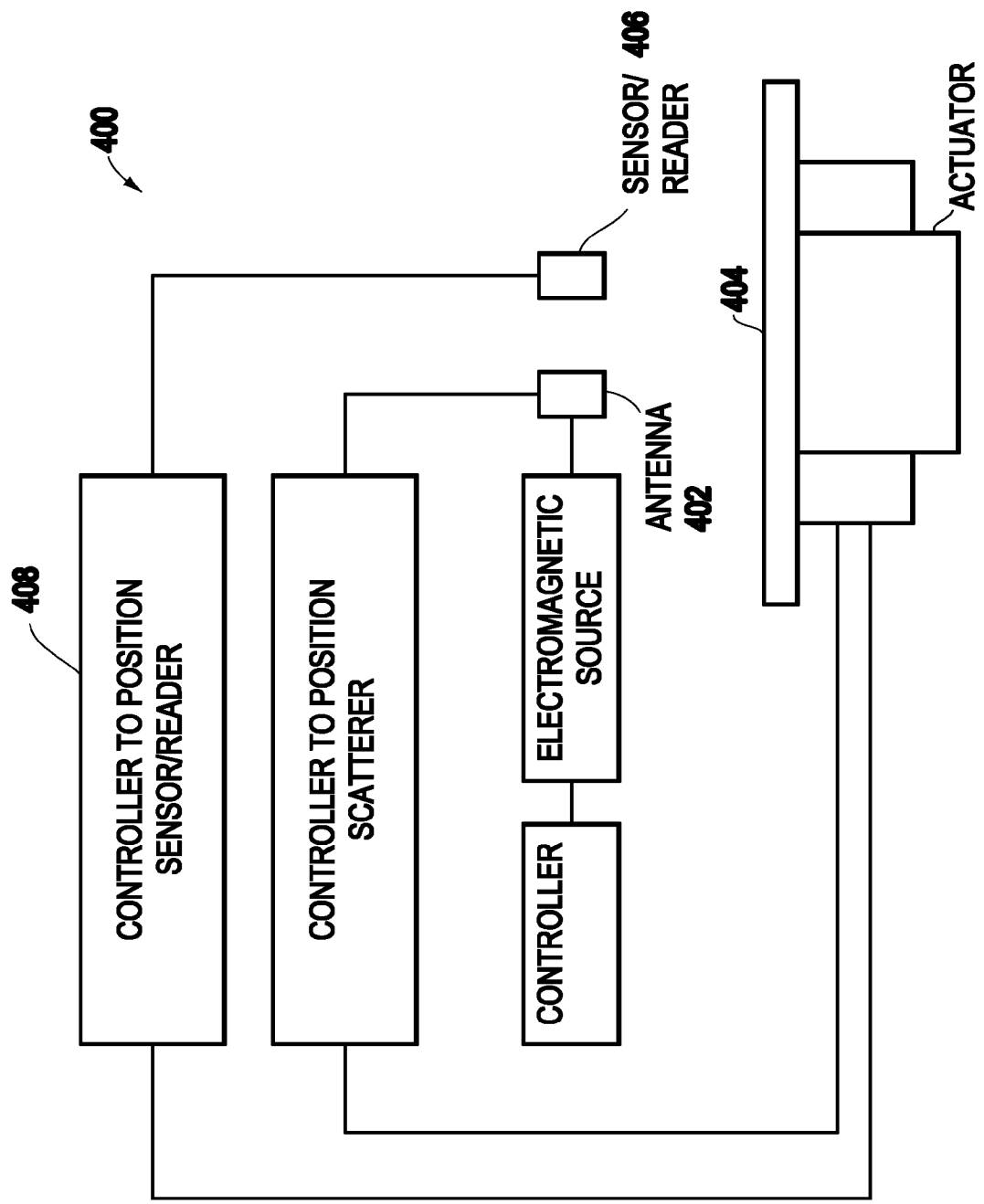
FIG. 4 shows a second exemplary apparatus 400 for performing a method in accordance with the invention.

FIG. 4 shows a second exemplary apparatus 400 for performing a method in accordance with the invention. The second exemplary apparatus 400 includes some additional components and capabilities over the first exemplary apparatus 100.

In the apparatus 400 the antenna for recording (writing/erasing) and for reading is preferably a single element 406. For recording, the field of an incident laser is coupled to the antenna 402. Antenna 402 generates a strong local near-field which interacts with the phase-change media 404 and provides local heating of the media 404. Modulating the power of this laser in accordance with a data signal results in the recording (writing/erasing) of the data signal in the media 404.

For reading, the incident laser power is reduced so that the near-field and its interaction with the phase-change media does not alter the phase of the storage media. Rather, the sensor 406 detects the laser light scattered by the near-field of the optical antenna. The sensor 406 may use interferometric methods to detect the data signal embedded in the media. These interferometric methods measure the scattered field from the near-field interaction between the antenna and the phase-change media. The sensor 406 is sensitive to the differences in the index of refraction between amorphous and crystalline regions in the phase-change media. Thus, the data signal may be determined based upon the sensing of these regions.

FIG. 4 also shows a position controller 408, which enables the assembly to read data written on the phase change media 404 by coordinating the initial positioning of the magnetic sensor 406 and the phase change media 404. Read out methods may include any sensor, such as a near-field optical sensor or electrical sensor. The near-field sensor may be the same element as the optical antenna used for recording; for example, the sensor and the antenna may be an atomic force microscope tip.

Figure 5A:
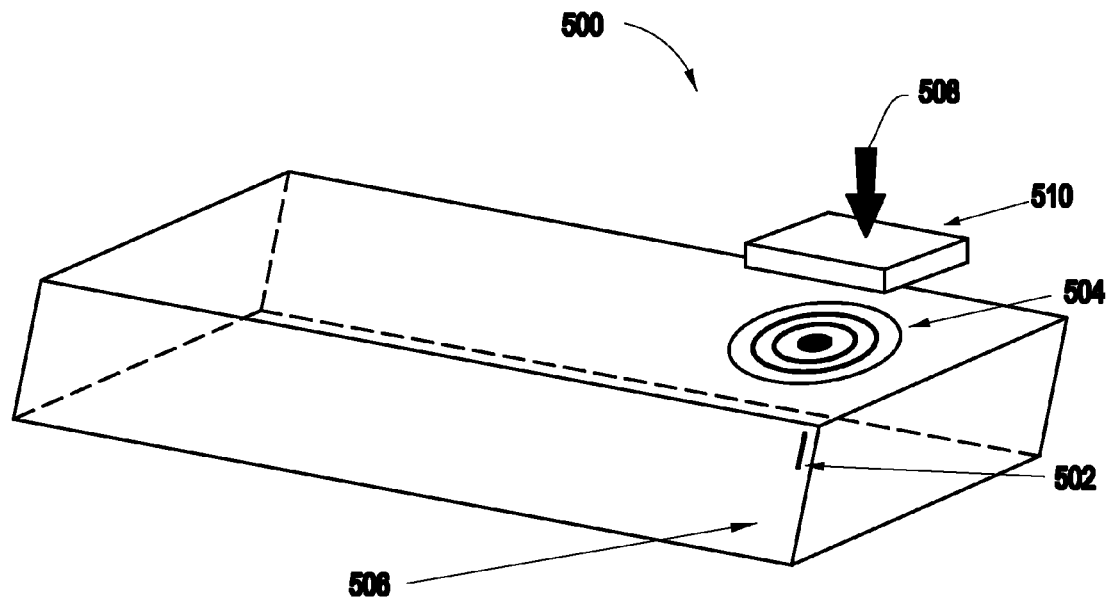
FIGS. 5A and 5B show one exemplary embodiment of a slider which may form a part of an apparatus of FIG. 1 and/or FIG. 4.
Figure 5B:
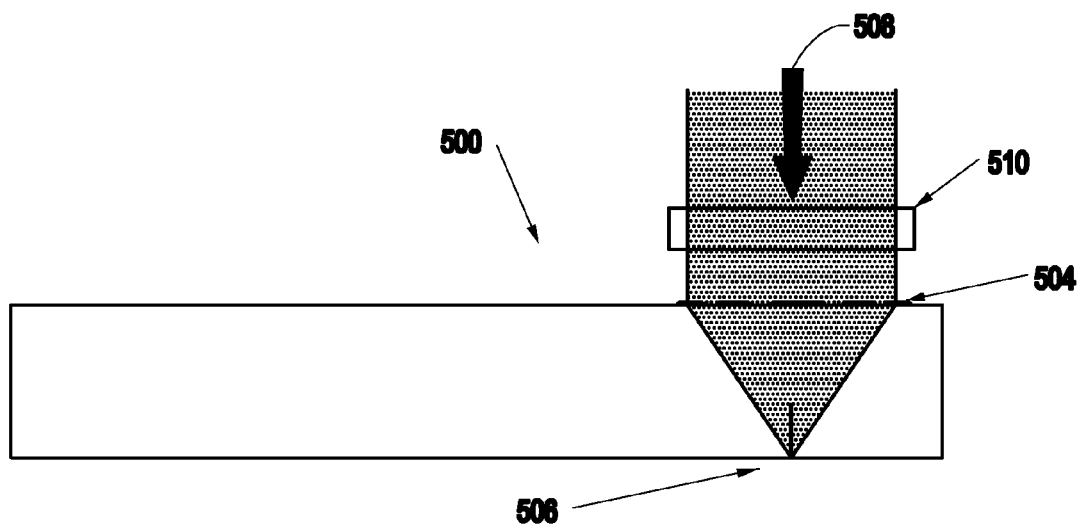

FIGS. 5A and 5B show one exemplary embodiment of a slider 500, having similar gliding properties as a slider for a conventional magnetic recording head. The slider 500 includes an antenna (scatterer) 502, and a lens 504. The slider 500 (or part of it) may be made out of transparent material, like glass, or alumina, or plastic. The scatterer 502 may be a small strip of metal inside the transparent slider 500, positioned close to an air-bearing surface 506 of the slider 500.

The scatterer 502 may be lithographically defined, using techniques similar to those for the fabrication of conventional thermo-magnetic recording heads.

Similarly, the lens 504 may be a lithographically defined integrated lens. The focal point of the lens 504 is defined to be at the intersection of the air bearing surface 506 and the scatterer 502. A laser beam 508 is directed toward the lens 504 and is focused at the air bearing surface 506 on the end of the scatterer 502. For this purpose, a miniature laser diode (not shown) can be directly mounted on (or above) the slider 500.

Alternatively, the laser light 508 may be provided via an optical fiber (not shown). A polarization controlling element 510 may convert the laser beam polarization into a radial polarization.

While the invention has been described in terms of several preferred embodiments, those skilled in the art will recognize that the invention can be practiced with modification within the spirit and scope of the appended claims.

Further, it is noted that Applicant's intent is to encompass equivalents of all claim elements, even if amended later during prosecution.

The invention claimed is:

1. An assembly for recording and reading data, comprising:
a phase change media comprising a chalcogenide having a thermal conductivity of approximately 0.6 W/mK in a crystalline phase and approximately 0.2 W/mK in the amorphous phase;
an antenna including a nanometric scattering solid placed adjacent said phase change media; and
a source of electromagnetic radiation to provide an incident wave of electromagnetic radiation to drive said antenna so as to produce non-propagating, near-field electromagnetic radiation from said antenna.

2. The assembly of claim 1, further comprising a position controller that positions said antenna in a plane adjacent to said phase change media.

3. The assembly of claim 1, wherein said antenna couples said incident wave from said source of electromagnetic radiation.

4. The assembly of claim 3, wherein said coupling of said incident wave by said antenna induces heating in said phase change media to record said high-density data.

5. The assembly of claim 1, wherein said source of electromagnetic radiation modulates a localized electromagnetic field based upon an information signal.

6. The assembly of claim 1, wherein said antenna reads data recorded in said phase change media.

7. The assembly of claim 6, wherein said antenna senses an optical field.

8. The assembly of claim 6, wherein said antenna senses a near-field optical signal to probe a local optical property of said phase-change media.

9. The assembly of claim 1, wherein said phase change media has a thermal conductivity which is lower than or equal to a substrate supporting said phase change media.

10. A method of recording and reading data, comprising:
providing a source of electromagnetic radiation;
providing a phase change media comprising a chalcogenide having a thermal conductivity of approximately 0.6 W/mK in a crystalline phase and approximately 0.2 W/mK in the amorphous phase; and
positioning an antenna including a nanometric scattering solid adjacent said phase change media which receives said electromagnetic radiation so as to produce non propagating, near-field electromagnetic radiation.

11. The method of claim 10, further comprising positioning said antenna in a plane adjacent to said phase change media.

12. The method of claim 10, further comprising coupling electromagnetic radiation from said source to said phase change media using said antenna.

13. The method of claim 12, wherein said coupling induces heating in said phase change media.

14. The method of claim 10, further comprising modulating electromagnetic radiation from said source based upon an information signal.

15. The method of claim 10, further comprising reading said data in said phase change media using said antenna.

16. The method of claim 15, wherein said providing an antenna comprises providing a near field optical sensor.

17. The method of claim 15, further comprising sensing a near-field optical signal to probe a local optical property of phase-change media using said antenna.

18. The method of claim 10, wherein said phase change media has a thermal conductivity which is less than or equal to a substrate.

19. An assembly for recording and reading data on a recording media as a series of tags, the assembly comprising:
a phase change media comprising a chalcogenide having a thermal conductivity of approximately 0.6 W/mK in a crystalline phase and approximately 0.2 W/mK in the amorphous phase;
an antenna including a nanometric scattering solid positionable adjacent said media;
a source of electromagnetic radiation that produces an incident wave to excite the antenna to thereby generate an enhanced and highly localized electromagnetic field in the near vicinity of the phase change media; and
a positioning device that coordinates mutual positioning of said source of electromagnetic radiation and said antenna so that said antenna couples said incident wave to said media by generating non-propagating, near-field electromagnetic radiation from said antenna from said electromagnetic radiation incident on said antenna.

20. The assembly of claim 19, wherein said coupled incident wave induces local heating in said phase change media to record data.

21. The assembly of claim 19, wherein said coupled incident wave reads data recorded in said phase change media.

22. The assembly of claim 1, further comprising a position controller that positions said antenna in a plane adjacent to said phase change media,
wherein said antenna couples said incident wave from said source of electromagnetic radiation,
wherein said source of electromagnetic radiation modulates a localized electromagnetic field based upon an information signal,
wherein said antenna reads data recorded in said phase change media, and
wherein said phase change media has a thermal conductivity which is lower than or equal to a substrate supporting said phase change media.

23. The assembly of claim 1, wherein the phase change media comprises a thermal conductivity at least 10 times smaller than a thermo-magnetic media.

24. The assembly of claim 1, wherein the antenna is configured to change the phase change media from a crystalline phase to an amorphous phase.

25. The assembly of claim 1, wherein the antenna is configured to heat the phase change media to a temperature of approximately 500° C.

26. The assembly of claim 1, wherein the incident wave comprises a drive beam, said drive beam being radial in shape to provide polarization along an elongated probe axis.

* * * * *